(12) United States Patent
Dangi et al.

(10) Patent No.: US 12,130,705 B2
(45) Date of Patent: Oct. 29, 2024

(54) OPPORTUNISTIC SEEDING TO A BACKUP APPLIANCE

(71) Applicant: Dell Products L.P., Round Rock, TX (US)

(72) Inventors: Salil Dangi, Mission Viejo, CA (US); Donna Barry Lewis, Holly Springs, CA (US)

(73) Assignee: Dell Products L.P., Round Rock, TX (US)

( * ) Notice: Subject to any disclaimer, the term of this patent is extended or adjusted under 35 U.S.C. 154(b) by 352 days.

(21) Appl. No.: 17/647,785

(22) Filed: Jan. 12, 2022

(65) Prior Publication Data

US 2023/0222036 A1    Jul. 13, 2023

(51) Int. Cl.
*G06F 11/10* (2006.01)
*G06F 11/14* (2006.01)

(52) U.S. Cl.
CPC ............... *G06F 11/1451* (2013.01)

(58) Field of Classification Search
None
See application file for complete search history.

(56) References Cited

U.S. PATENT DOCUMENTS

| | | | | |
|---|---|---|---|---|
| 7,636,743 | B2 * | 12/2009 | Erofeev | G06F 16/166 |
| 8,589,347 | B2 * | 11/2013 | Erofeev | G06F 11/2094 |
| | | | | 707/634 |
| 2011/0295806 | A1 * | 12/2011 | Erofeev | G06F 11/2094 |
| | | | | 707/634 |

* cited by examiner

*Primary Examiner* — Belix M Ortiz Ditren
(74) *Attorney, Agent, or Firm* — Workman Nydegger (57) ABSTRACT

One example method includes by a data source entity, querying a data storage entity to determine if it has adequate under-utilized resources to perform a portion of a data seeding process. When the data storage entity indicates to the data source entity that the data storage entity has adequate unused resources to perform the portion of the data seeding process, initiating, by the data source entity, the data seeding process, and the data seeding process includes transmitting data from the data source entity to the data storage entity for storage in a temporary file at the data storage entity, and the data that is transmitted is data that was targeted to be protected by a data protection process. Finally, the data protection process may be performed so that only data not already present at the data storage entity is transmitted by the data source entity to the data storage entity.

20 Claims, 5 Drawing Sheets

STEP 1a: DATA IS INGESTED ON CLIENT

STEP 1b: NEW DATA IS MOVED TO TEMP FILE ON APPLIANCE WHEN SYSTEM/NETWORK ARE MOSTLY IDLE.

STEP 2: DATA MOVEMENT ISN'T NEEDED AT THE TIME OF BACKUP. FASTER BACKUP, LESS RESOURCE CONTENTION AT PEAK HOURS.

OPPORTUNISTIC SEEDING TO A BACKUP APPLIANCE

FIELD OF THE INVENTION

Embodiments of the present invention generally relate to data protection processes. More particularly, at least some embodiments of the invention relate to systems, hardware, software, computer-readable media, and methods for seeding data to a backup appliance so as to reduce backup times.

BACKGROUND

A physical or virtual backup appliance is a storage device optimized for storing backup data. Deduplication is a common optimization technique. With deduplication, data is broken into segments, and when files share the same data segments, the system maintains references from the files to the common data segments, rather than storing a duplicate copy of the data itself.

Client-side deduplication, or inline deduplication, is a further enhancement in which the backup client breaks the file into segments and fingerprints the various segments. The fingerprints are then sent to the server and the server determines whether the segment is a duplicate. This method saves bandwidth by only sending unique data to the appliance. This inline deduplication process significantly improves backup times and bandwidth efficiency when most of the data is already resident on the server and only a small portion of new data needs to be sent. The Dell Data Domain system (DD) is an example of a backup appliance, and the DD Boost library is an example of the client software that the backup appliance uses to perform inline deduplication.

The backups for individual clients are generally taken 1 or 2 times a day. Many customers only take 1 backup per day outside of their normal business hours. These backups must be 100% accurate and retained for the required duration. However, the clients generate data for most of the day, but the data protection system may see this data all at once when the backup is taken. Data protection system telemetry data is consistent, indicating that the data protection systems are generally idle or significantly under-utilized for long periods of time, with recurring daily spikes of activity.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings.

DETAILED DESCRIPTION OF SOME EXAMPLE EMBODIMENTS

Embodiments of the present invention generally relate to data protection processes. More particularly, at least some embodiments of the invention relate to systems, hardware, software, computer-readable media, and methods for seeding data to a backup appliance so as to reduce backup times.

In general, example embodiments of the invention may implement an opportunistic dump of any new client data that is likely to be sent later to a data protection system as part of an actual data protection process. This new client data is written and stored in temporary files. After the data dump, at the time of the actual backup, the deduplication rate would be significantly greater due to this previous seeding of the new client data in the temporary file. Moreover, the overall backup performance, both in terms of bandwidth consumption and speed of performance, should improve since the new data is already present on the backup appliance and does not have to be sent by the client. Embodiments of the invention do not place any significant burden on either the client or the data protection system, but simply seek to identify times when the data protection system is mostly idle, there is available bandwidth, the client has available resources, and to use a low number of resources on the client to drive the seeding.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

In particular, one advantageous aspect of at least some embodiments of the invention is that the speed of backup processes may be increased without placing any additional significant processing burden on either the client that generated the data, or on the data protection system that backs up the data. An embodiment may make use of data protection system idle time to improve backup process performance. An embodiment may employ and AI/ML model to make opportunistic use of data protection system idle time by considering various parameters to guide that usage. Various other advantageous aspects of example embodiments will be apparent from this disclosure.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods processes, and operations, are defined as being computer-implemented.

A. INTRODUCTION

As noted earlier, backups for individual clients may be taken 1 or 2 times a day. In some cases, a customer may only take 1 backup per day outside of their business hours. Thus, while the clients typically generate data on an ongoing basis during the day, the data protection system only sees this data, and then all at once, when the backup is taken. The DD telemetry data is consistent, showing systems are generally idle or significantly under-utilized for long periods of time, with the same daily spikes of activity.

Figure 1:
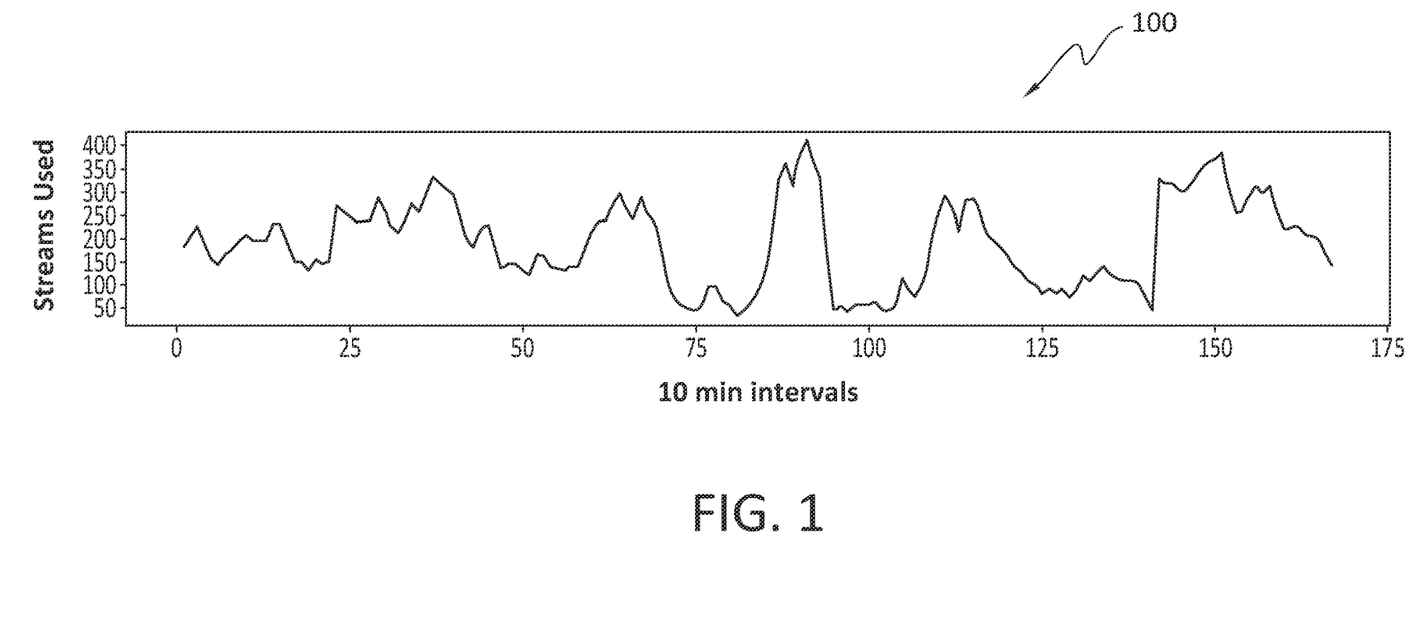
FIG. 1 discloses a graph showing resource utilization at a backup system over a defined time period.

The example graph 100 in FIG. 1 was taken from a high-end DD system with 1885 backup streams available. As indicated in the graph 100, the data protection system rarely used even 10% of its available backup streams, and frequently fell below 1% usage of those available backup streams. Thus, data protection systems may have significant amounts of unused capacity.

Accordingly, example embodiments are directed to ways in which a data protection system can see new client data before the actual backup of that new client data is performed. Such an approach may enable not only deduplication, but more importantly, backups may run significantly faster since most, if not all, of the scheduled backup process is simply data deduplication. This is because the new data, by definition, will not need to be written to the appliance, and has been sent to the backup system prior to performance of the scheduled backup, that is, outside of the backup window. Thus, the new data need only be deduplicated, at the appliance.

B. EXAMPLE OPERATING ENVIRONMENTS

The following is a discussion of aspects of some example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, data protection operations which may include, but are not limited to, data replication operations, IO replication operations, data read/write/delete operations, data deduplication operations, data backup operations, data restore operations, data cloning operations, data archiving operations, and disaster recovery operations. More generally, the scope of the invention embraces any operating environment in which the disclosed concepts may be useful.

At least some embodiments of the invention provide for the implementation of the disclosed functionality in existing backup platforms, examples of which include the Dell-EMC NetWorker and Avamar platforms and associated backup software, and storage environments such as the Dell-EMC DataDomain (DD) storage environment and associated backup appliances and data protection systems and components. In general however, the scope of the invention is not limited to any particular data backup platform or data storage environment.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment. Where a backup comprises groups of data with different respective characteristics, that data may be allocated, and stored, to different respective targets in the storage environment, where the targets each correspond to a data group having one or more particular characteristics.

Example cloud computing environments, which may or may not be public, include storage environments that may provide data protection functionality for one or more clients. Another example of a cloud computing environment is one in which processing, data protection, and other, services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients that are capable of collecting, modifying, and creating, data. As such, a particular client may employ, or otherwise be associated with, one or more instances of each of one or more applications that perform such operations with respect to data. Such clients may comprise physical machines, or virtual machines (VM)

Particularly, devices in the operating environment may take the form of software, physical machines, or VMs, or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, may likewise take the form of software, physical machines or virtual machines (VM), though no particular component implementation is required for any embodiment. Where VMs are employed, a hypervisor or other virtual machine monitor (VMM) may be employed to create and control the VMs. The term VM embraces, but is not limited to, any virtualization, emulation, or other representation, of one or more computing system elements, such as computing system hardware. A VM may be based on one or more computer architectures, and provides the functionality of a physical computer. A VM implementation may comprise, or at least involve the use of, hardware and/or software. An image of a VM may take the form of a .VMX file and one or more .VMDK files (VM hard disks) for example.

As used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

As used herein, the term 'backup' is intended to be broad in scope. As such, example backups in connection with which embodiments of the invention may be employed include, but are not limited to, full backups, partial backups, clones, snapshots, and incremental or differential backups.

C. ASPECTS OF SOME EXAMPLE EMBODIMENTS OF THE INVENTION

Example embodiments may implement a deduplication, or 'dedup,' client seeding process. In particular, some example embodiments may implement and run a very low priority client thread/process, that is, a process running on the client, that has the capability to intercept all writes going to specified disks/volumes. Embodiments of the process may use either AI/ML and/or static definitions to intelligently intercept writes, for example, by ignoring data writes from the same set of offsets, or ignoring writes that simply operate to swap files between different locations. Among other things, the process may determine if data should be sent to the data protection system and, if so, when the data should be sent.

Example embodiments may also include intelligence to determine the best mode of writing data, for example VSS (variable size segmented) or FSS (fixed size segmented), and also to automatically utilize either the DSP (distributed segment processing, that is, client side dedupe) when the client has CPU resources available, or to use the server side dedupe when the server has resources available.

Embodiments of the process may be lightweight in terms of their impact on client operations, and client hardware and software resources. For example, some embodiments may be configurable to use a maximum, for example, of under 50% of a core, an average of under 20% of the capacity of a core, under 10 MBPS on the wire, and a limited amount of RAM for buffering. Additional constraints for operation of the process may be specified, or auto throttled on the fly by while the process watches the utilization/availability of backup streams. That is, the data seeding process may be self-throttled. As such, no external control of the data seeding process may be needed, or required. However, it is nonetheless possible that one or more external inputs may be used to drive, throttle, or otherwise affect, implementation and performance of the data seeding process.

In brief, example embodiments of the process may query the data protection system, which may comprise a backup appliance hardware and/or software in some cases, to identify when the data protection system is in an under-utilized state and has the time and resources available to process the data, and its associated metadata, that was, and/or is, being intercepted at the client. When the data protection system and other resources are busy, the example process may discard the intercepted data and metadata, and when the data protection system indicates it can accept the new data, and associated metadata, obtained from the intercepted writes, the process running on the client may open a special temporary file and begin writing the data from the intercepted writes to that temporary file. As the data is written, the data protection system may reply to the client process with an acknowledgement that the data is being received by the data protection system, and a flow control indicator indicating the volume of data being received and written to the temporary file. At any point during the process of writing data to the temporary file at the data protection system, the client may pause or stop sending data to the data protection system when the data protection system indicates it is no longer in a state where it has extra resources available for processing the intercepted data. Alternatively, the client may periodically query the data protection system to determine if the data protection system can continue to accept data writes.

Further, the data writing process may use the same inline deduplication process as it does with real writes so even the data seeding at the data protection system will be bandwidth efficient. That is, the data may be deduplicated, to the extent necessary, as it is written to the temporary file. The data writing process may switch to a non-DSP mode when appropriate.

The data protection system, when queried by the client, and/or on its own initiative, will return an indication to the client if the data protection system is in an under-utilized state where its backup streams are not fully utilized, and can accept data from the client. Note that if a resource, one example of which is a backup stream, is not utilized at all, that resource may be considered as being underutilized. As the data is being received by the data protection system, it may throttle back the data writes depending on the availability of various data protection system resources, examples of which include, backup streams, CPU utilization, disk space, and network bandwidth. The data received by the data protection system from the client may be placed in temporary files, bypassing the namespace. The temporary files may have a defined limited lifetime, such as 48 hours for example, upon the expiration of which, the temporary files may be deleted automatically by the data protection system.

With regard to backup processing, when the scheduled backups run, and if the backup appliance resources were already available earlier to support writing of data to a temporary file at the backup appliance, it is likely that most of the newly generated data from the client is already on the backup appliance, and now the client can dedupe rather than send the new data. This approach may cause the backup job to run ˜2×-4× faster, assuming that all the data was previously written from the client to the backup appliance.

C.1 Backup Operations

Figure 2:
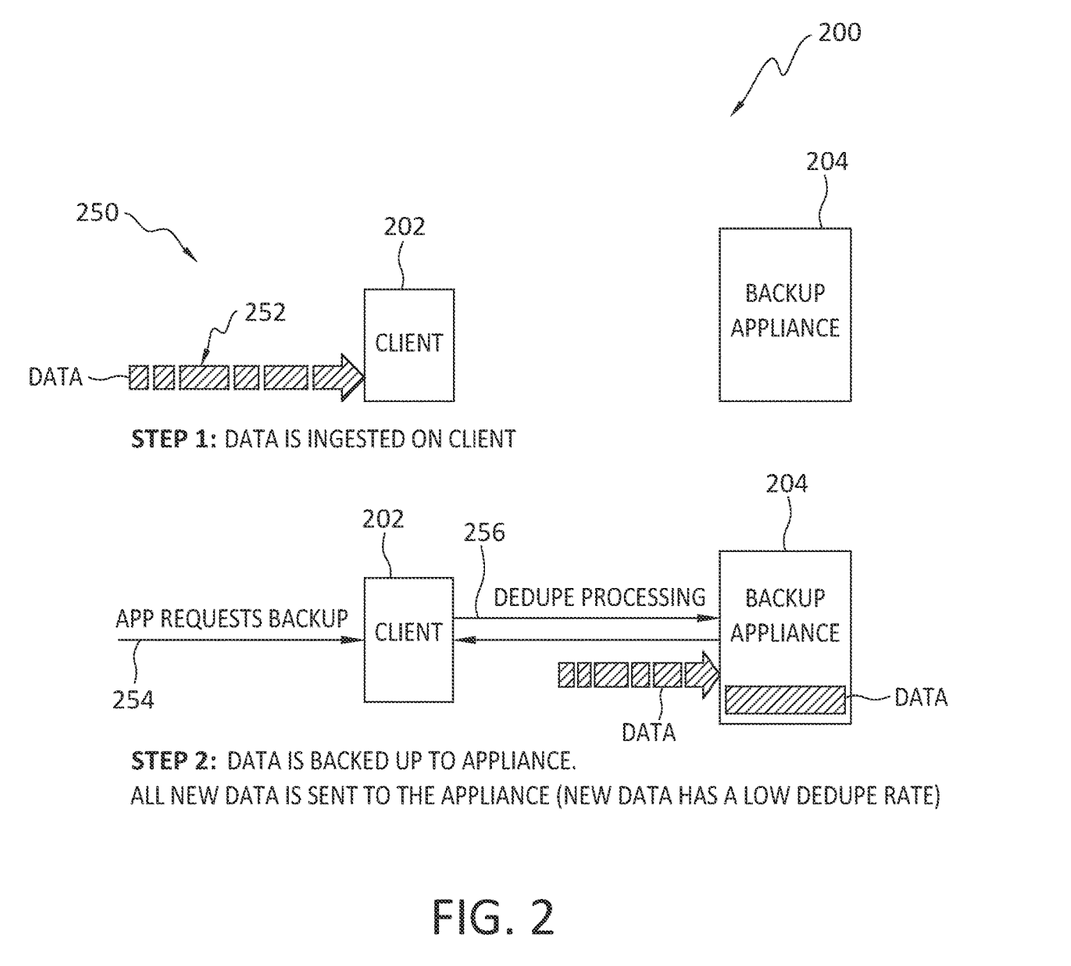
FIG. 2 discloses aspects of an operating environment in which embodiments of the invention may be implemented.

With particular attention now to FIG. 2, a data protection configuration 200 may comprise one or more client 202 that may ingest and/or generate data that is to be protected. Data protection may be implemented, in whole or in part, by one or more backup appliances 204. The operations disclosed in FIG. 2, discussed below, indicate how a data protection configuration might operate without the benefit of one of the disclosed embodiments.

As shown in FIG. 2, various data movements may be involved in the example data protection configuration 200. For example, a method 250 may involve ingestion 252, and/or creation of, data on the client 202. At some point after the data ingestion 252, the client may receive 254, such as from an app that generated the data, a request for backup of that data to the backup appliance 204. The client 202 may dedupe 256 the data before sending the data to the backup appliance 204 for backup. Further, all new data is also sent from the client 202 to the backup appliance 204. Because the data is new, by definition, little or no deduplication is required or performed with respect to the new data. That is, the dedup rate for the new data is typically low.

Figure 3:
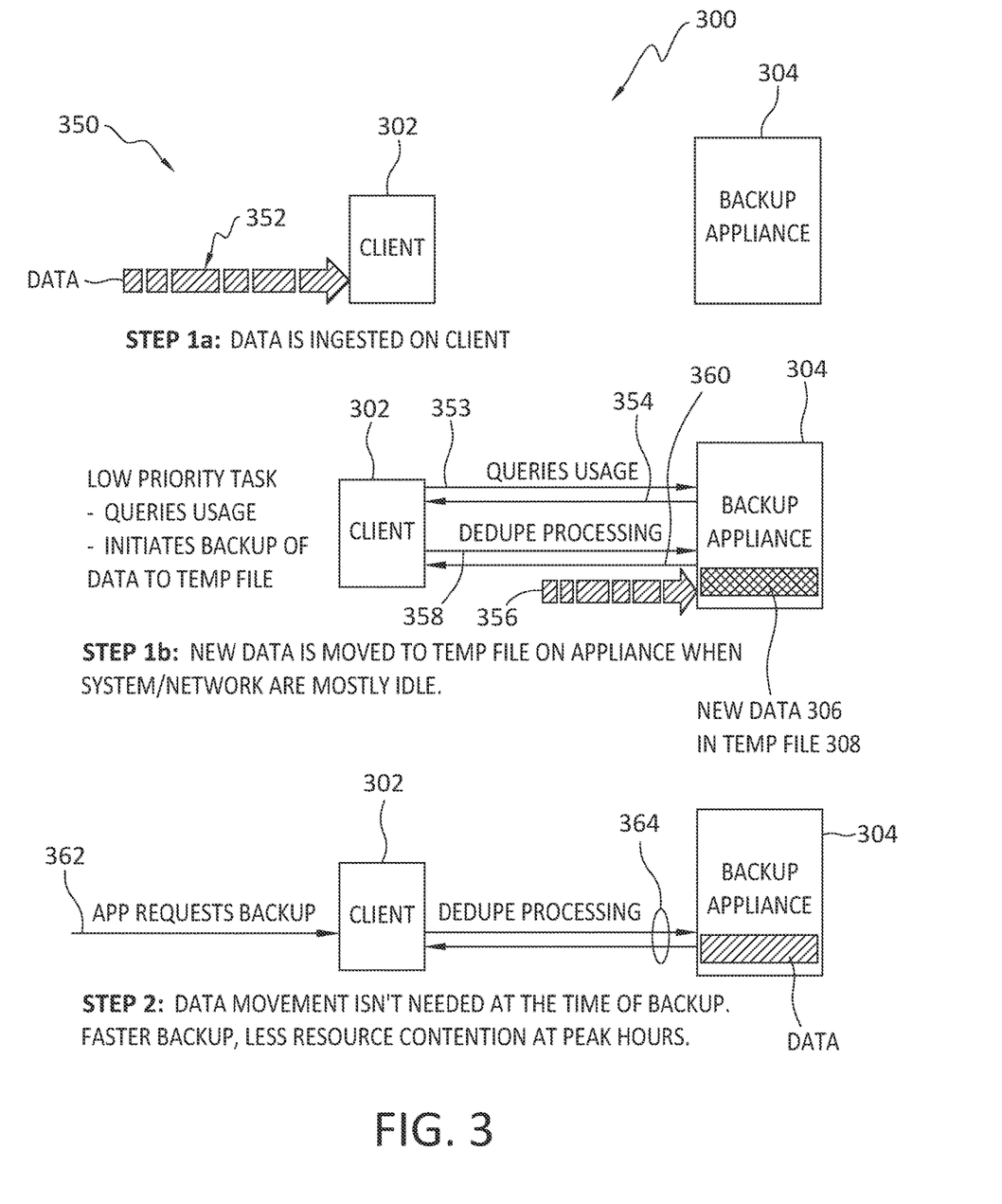
FIG. 3 discloses aspects of embodiments of the invention performed in one example operating environment.

With reference next to FIG. 3, an example data protection configuration 300 is disclosed that may include one or more clients 302 that communicate with a data protection system, such as backup appliance 304 for example. In general, FIG. 3 discloses an approach for movement of data between a client and a data protection system using opportunistic data seeding at the backup appliance 304 that takes advantage of times of low resource consumption by the data protection system.

A method 350 may be implemented in the data protection configuration 300. Initially, data may be created at, and/or ingested 352 by, the client 302. At some point after this creation and/or ingestion, the client 302 may receive, such as from an application that generated the data, a request to backup that data. In response to the backup request, the client 302 may query 353 the backup appliance 304 to determine whether the backup appliance 304 has adequate resources, such as backup streams and hardware and/or software resources, to receive and store, on an ongoing basis, data from the client 302. That is, the client 302 is querying the backup appliance 304 to determine if the backup appliance 304 can receive and store client data as that data is ingested and/or created at the client 302.

The backup appliance 304 may then respond 354 to the client 302 indicating whether or not adequate resources are available at the backup appliance 304 to support the data movement from the client 302. If the backup appliance 304 indicates it is unable to support receipt and storage of the client data, client operations may continue as usual. The client may re-query 352 the backup appliance 304 at one or more later times, and/or according to a query schedule. In some embodiments, the backup appliance 304 may automatically notify the client 302 when the backup appliance 304 has under-utilized, or unused, resources available for receiving and storing client 302 data.

On the other hand, when the backup appliance 304 responds 354 to the client 302 query 352 indicating that the backup appliance is able to receive and store, on an ongoing basis, data from the client 302, the client 302 may then initiate a task for interception of write operations occurring at the client 302. This task may also be referred to herein simply as the 'interception task.' As noted elsewhere herein, parameters controlling triggering, and performance, of the interception task, and writing of the related data at the backup appliance 304, may be defined and/or refined by an AI/ML model. In this way, any or all of the interception task running at the client 302, data dedup operations, data transmission operations, and data write operations at the backup appliance 304, may be expected to become more efficient, and faster, for a period of time due to their refinement, which may be ongoing, by the AI/ML model.

Operations for carrying out the interception task(s) may not adversely affect the write operations, nor place any material strain on any client resources, but may enable the client 302 to obtain a copy of the new/modified data that is being written, and to send the copy to the backup appliance 304. The interception task may be designated as 'low priority' or 'lowest priority' at the client 302 so that, in the event the client resources may be in danger of becoming overtaxed as a result of client 302 operations and tasks other than the interception task, the interception task can be terminated, possibly automatically, by the client 302, or by the data seeding process itself. As well, the interception task may be paused at any time.

As the writes are intercepted at the client 302, the client 302 may send 356, that is, backup, the data 306 associated with those writes to a temporary file 308 at the backup appliance 304. As shown in FIG. 3, the data may be deduped by cooperation between the client 302 and the backup appliance 304. For example, the client 302 may send 358 fingerprints of data to the backup appliance 304, and the backup appliance 304 may confirm 360 whether or not the data segments to which the fingerprints correspond are duplicates. Where a data segment is a duplicate of data already at the backup appliance 304, the data is not stored. On the other hand, if a data segment is new, that is, the data segment is not already stored at the backup appliance 304, then that data segment is transmitted 356 by the client 302 to the backup appliance 304, and stored in the temporary file 308.

With continued reference now to FIG. 3, an application may request 362 a backup of new/modified data generated by that application at the client 302. This may be a regularly scheduled backup, such as a backup that may be performed once or twice per day, for example. The client 302 may communicate 364 with the backup appliance 304 to identify any new data among the data to be backed up.

However, because the interception task may have been transmitting data from the client 302 to the backup appliance 304 on an ongoing basis, such as during a specified time period of 1 day, or 1 week, or 1 month, for example, much or all of the data requested 362 to be backed up may already have been stored, as a result of the running of the interception task, at the backup appliance 304. Even if the interception task only ran, for example, for a part of the day, at least the data that was intercepted, and later identified 362 for backup, will not have to be transferred from the client 302 to the backup appliance 304. That is, even if the interception task only ran for a relatively short period of time, a benefit is still provided since it is likely that at least some of the data that was requested to be backed up had already, as a result of the running of the interception task, been stored at the backup appliance at the time the request 362 was received.

In one scenario, suppose that the interception task ran substantially continuously, or for at least a majority of the time, between the time of a first backup, and the subsequent backup that was requested 362. In this case, there may be little or no movement of data from the client 302 to the backup appliance 304 when the regularly scheduled backup is performed, since it is likely that most data that would ordinarily be targeted for backup, by the request 362, has already been stored at the backup appliance 304 as a result of the running of the interception task. As such, in this illustrative case, the regularly scheduled backup process may proceed much more quickly than if all the data in the backup had to be deduped and then stored at the backup appliance 304. Further, because the regularly scheduled backup process is performed relatively more quickly than if the interception task had not been run, that backup process may require fewer hardware and/or software resources, and for a shorter period of time, than it would have otherwise, thus reducing resource demands and resource contention with other processes.

Finally, and as noted elsewhere herein, the interception task may intercept, and write to a backup appliance not only data, but also any metadata pertaining to that data. Such metadata may include, for example, offsets of the data indicating where the data is stored on disk at the client, the source of the data, information identifying the application that created/modified the data, the owner of the data, a date/time when the data was created/modified, the data type, and any other information concerning the data.

C.2 Replication Operations

Some example embodiments of the invention are directed to replication processes in which data is copied, not relocated, from a source to a destination or target. For example, the methods described in connection with FIG. 2 may be applied to data replication processes as well. Except as noted otherwise herein, the data seeding process for replication operations may be the same as the data seeding process used for backup operations. Note that in a data replication scenario, the data source may act as an opportunistic seeding client to seed the data to the replication target. In replication then, that client may work with different goals and constraints than those that drive the operation of the client in a backup scenario. For example, in replication, there may be no need to intercept writes since all of the data to be replicated is already at hand.

In general, and similar to the backup use case discussed herein, methods may be employed for opportunistic data seeding at a data target that takes advantage of times of low resource consumption by the data target, and/or by the data source from which the data is replicated to the data target. That is, the data seeding, whether performed in relation to a backup process or a replication process, may be opportunistic in the sense that the data seeding process is only performed if/when underutilized resources are available for its performance. As such, data seeding may, or may not, be performed in real time as a client is generating the data. For example, data to be seeded may be buffered, and then seeded at a later time when resources are available.

By way of background, data sources and data targets may maintain respective data tracking structures, such as Mtrees for example, to help ensure that data is accurately replicated from the data source to the data target. For example, if a data source Mtree matches a data target Mtree, then it can be concluded that, at least with respect to data represented in the source Mtree, that data is also present at the target.

Further, if an Mtree at the data source is identified as one that consistently replicates to a specific data target, the data source can seed the data to the data target as that data is being ingested at the data source being ingested, in cases where both systems have available and adequate resources to implement data copying and storage.

The seeding of the data may take place on ingest at the data source, when resources are available on both the data source and the data target to enable performance of the replication process. Various cases may be defined in which the data seeding process will be performed, where examples of such cases may include, but are not limited to:
 there is an Mtree replication policy configured for a replication data source to a data target;
 Managed File Replication is consistently used for all files in the data source Mtree; and/or
 Managed File Replication is consistently used for specific file types of a data source Mtree—in this case, if the same types of files are consistently replicated, these files can be seeded during ingest to the source data system.

As in the data backup scenario discussed herein in connection with FIG. 2, if at the time of replication from the data source to the data target, some or all of the data targeted for replication is already resident on the target system due to data seeding, the replication process may proceed relatively faster, and consume far fewer resources, than if the data had not been seeded at the data target prior to performance of the replication process.

Figure 4:
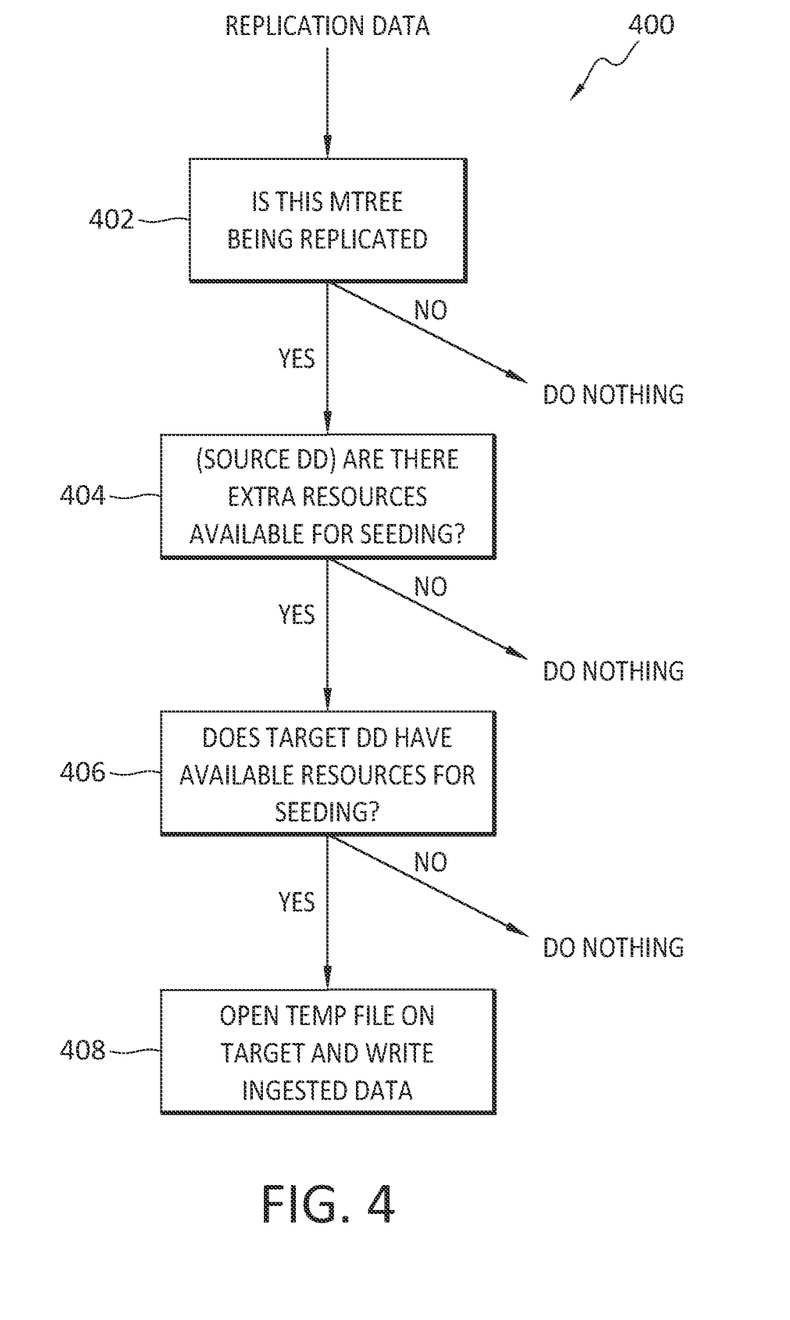
FIG. 4 discloses an example data seeding process performed in connection with replication operations.

Turning now to FIG. 4, an example method 400 for data seeding in connection with a data replication process is disclosed. Initially, a determination 402 may be made as to whether the data represented by a particular Mtree is being replicated. If not, the method 400 may terminate, or do nothing.

If it is determined 402, on the other hand, that the data represented by the Mtree is being replicated, then the data source may determine 404 whether or not it has adequate resources, such as CPU, bandwidth, cores, and any other relevant resources, available to perform a data seeding process in which data is sent from the data source to the data target prior to performance of a replication process that is intended to replicate that data from the data source to the data target.

If adequate resources are not available, then the method 400 may terminate, or do nothing. If it is determined 404 that adequate resources are available, whose use would not compromise the performance of other data source operations, then the method 400 may next determine 406 whether or not the data target has adequate sources available to support a data seeding process. If the data target does not have adequate resources, the method 400 may terminate, or do nothing.

On the other hand, if it is determined 406 that the data target has adequate sources available to support a data seeding process, then the method 400 may advance to 408 and open a temporary file at the data target. The data ingested at the data source may then be written to the data target. Note that, as in the example of the backup use case described earlier, the data may be written to the data target upon ingestion at the data source.

D. FURTHER DISCUSSION

D.1 Example Aspects of Some Embodiments

As apparent from this disclosure, example embodiments may comprise various features. For example, embodiments include methods that implement an opportunistic approach for intelligently seeding a backup appliance with data prior to the real backup processing in an effort to speed the backup processing. As another example, methods according to example embodiments implement an opportunistic approach for intelligently seeding a replication target system with backup data prior to the replication cycle. Further, example embodiments may be implemented without overloading resources of the replication target, backup appliance, client, data source, or network, to perform backup seeding or replication seeding. Particularly, example embodiments may make use of windows of time when the resources of the environment are under-utilized. Finally, example embodiments within the scope of the invention do not add a dependency on the backup application, but may instead employee a data seeding process that may be performed independently of a backup process and backup application.

D.2 Opportunistic Data Seeding—Backup, and Replication

An opportunistic data seeding process, whether performed in connection with a backup process or with a replication process, may have various features and components. Examples of such features and components are discussed below.

For example, a data seeding process may be designated as the lowest priority traffic, where it may fail anywhere but it may be expected that when resources exist, the data seeding process will be performed. That is, there is not necessarily a guarantee of delivery of any data by way of a seeding process. In this respect at least, a data seeding process may be similar to UDP (User Datagram Protocol) traffic, where there are no guarantees of data delivery, and the process may fail at any time when adequate resources are no longer available.

Example embodiments may be implemented in various environments, one example of which is the Dell DataDomain (DD) data protection system. In this environment, at a high level, there may be a Dell DDBoost service that will be able to accept data, such as from existing write filters, from a VMware infrastructure, or through a new DD Boost application interface, and try to consume that data, that is, deliver that data to the DD data protection system.

Embodiments of a data seeding service and method may be configurable and constrained to not consume resources beyond specified average and maximums. Further, constraints may be definable by time/day slots such as, for example, CPU of 5% prior to 800 AM, 1% from 800 AM to 600 PM, and 8% from 600 PM-800 PM.

Further, example embodiments of a data seeding service and method may continuously monitor the current conditions on the client/network/target/backup system, and act accordingly. Further, embodiments may be configured so that, for example, a backup appliance may update/throttle performance of the data seeding service based on the availability of under utilized resources at the backup appliance. Likewise, a data target may similarly throttle/update performance of a data seeding service. In some instances, a backup management application may be configured to dynamically configure/control the data seeding service In some embodiments, at a basic level, a data seeding service will expect raw data that is about to be sent or written to a write media, and the data seeding service may copy the buffer, provided the data seeding service has adequate memory available to it, else it will be an immediate return. The data seeding service will not block the write filter for any more than the time taken to copy the data. All of memory allocations may have been done prior to accepting the call to copy the data. At the next level, the data seeding service may accept other parameters such as disk/volume, and offset where the data is getting written, as the data seeding service may use those parameters, or metadata, to determine, and later ignore, if certain areas are being written repeatedly.

The data seeding service may stay in the ready-for-input state only when memory buffer is available. It is expected that, in some embodiments, there will be no need for more than ⅜MiB of buffering, although that amount may be configurable, so that the data seeding service may remain relatively thin in terms of the resources it needs.

It is noted that embodiments may refer to opportunistic data seeding since, if an opportunity to seed data is present at the time data is available, and resources are available, then the data will be delivered to the backup system or replication data target, as applicable, and the data seeding process may be helpful to reduce the elapsed time of a real backup or replication process that is performed later, after the data seeding. If an opportunity for data seeding was not present, then there is no harm done since the data seeding service does not have any other function. In some instances, performance of a data seeding service may reduce the new bytes by over 33% for most clients, which, in turn, may help cut the elapsed time of the backups down by about 25%.

Further, it is not expected that implementation of data seeding will have any detrimental effects on dedup. In some cases, where data is randomly written and in smaller chunks, there will not be any useful segmentation. Moreover, in some embodiments, the data seeding logic may not seed the data unless a disk area or other storage area of specified size is modified, such as 64+KB for example.

Even if a customer should need an exclusive backup window and no interference during the production/premier time, embodiments of the invention will permit that choice. Customers may opt to have the data seeding service disabled, or severely constrained. For example, a customer may start with a highly constrained set of parameters for a data seeding service, and then increase or decrease the level of constraints imposed on the seeding service. For example, a customer may specify that data seeding, if performed at all, will only be performed outside a window of time specified by the customer.

Finally, even if some operating environments provide a relatively small window of time when CPU and network bandwidth is underutilized, this is not the case in other environments and, in any event, example embodiments of seeding processes may use very little in the way of resources. As noted herein, a data seeding method according to some example embodiments may throttle itself, and on its own initiative, based on the configured parameters and dynamically altering conditions with no guarantee. Moreover, a data seeding process may run as the lowest priority task of a client or other computing entity.

To illustrate with some examples concerning resource usage, given a primary backup time of 15 minutes, with ~30 GB of changes, even if the system drops 10 GB of data due to CPU/Network/DD availability, there will still be about 8-12 hours available to push 15-20 GB of data and that should not require even 1% average additional CPU/NW load. For a larger client that generates, for example, 200 GB of new data daily and takes an hour to perform a backup, given a typical ingest rate of 200 GBPH of new data, if an example data seeding process is able to find one or more time slots during the normal operational window of 8-12 hours, the collective value of these slots may be relatively small, just a sixteenth or less of what would be seen during the backup time. This requires very little load on the machine. Thus, this example data seeding process may try to find opportunities to perform a 100 GB backup during the 8-12 hours, if ample resources are available.

E. EXAMPLE METHODS

It is noted with respect to the example methods of FIG. 2-4 that any of the disclosed processes, operations, methods, and/or any portion of any of these, may be performed in response to, as a result of, and/or based upon, the performance of any preceding process(es), methods, and/or operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted. Finally, and while it is not required, the individual processes that make up the various example methods disclosed herein are, in some embodiments, performed in the specific sequence recited in those examples. In other embodiments, the individual processes that make up a disclosed method may be performed in a sequence other than the specific sequence recited.

F. FURTHER EXAMPLE EMBODIMENTS

Following are some further example embodiments of the invention. These are presented only by way of example and are not intended to limit the scope of the invention in any way.

Embodiment 1. A method, comprising: by a data source entity, querying a data storage entity to determine if the data storage entity has adequate under-utilized resources to perform a portion of a data seeding process; when the data storage entity indicates to the data source entity that the data storage entity has adequate unused resources to perform the portion of the data seeding process, initiating, by the data source entity, the data seeding process, and the data seeding process comprises transmitting data from the data source entity to the data storage entity for storage in a temporary file at the data storage entity, wherein the data that is transmitted is data that was targeted to be protected by a data protection process; and performing the data protection process so that only data not already present at the data storage entity is transmitted by the data source entity to the data storage entity.

Embodiment 2. The method as recited in embodiment 1, wherein the data protection process is either a data backup process, or a data replication process.

Embodiment 3. The method as recited in any of embodiments 1-2, wherein the data seeding process is designated as a statically/dynamically configurable lower priority process at the data source entity.

Embodiment 4. The method as recited in any of embodiments 1-3, wherein the data is deduplicated before being sent to the data storage entity.

Embodiment 5. The method as recited in any of embodiments 1-4, wherein performance of the data protection process proceeds more quickly than it would if the data had not been transmitted to the data storage entity prior to performance of the data protection process.

Embodiment 6. The method as recited in any of embodiments 1-5, wherein the data is ingested by, and/or generated at, the data source entity.

Embodiment 7. The method as recited in any of embodiments 1-6, wherein the data protection process sends only new data to the data storage entity.

Embodiment 8. The method as recited in any of embodiments 1-7, wherein an AI/ML model configures and controls the data seeding process.

Embodiment 9. The method as recited in any of embodiments 1-8, wherein an amount of deduplication that is performed as part of the data protection process is less than the deduplication that would be required if the data seeding process were not performed.

Embodiment 10. The method as recited in any of embodiments 1-9, wherein the data source entity obtains the data by intercepting write operations taking place at the data source entity, and the data seeding process is performed on an ongoing basis as the write operations are intercepted.

Embodiment 11. A method for performing any of the operations, methods, or processes, or any portion of any of these, disclosed herein.

Embodiment 12. A non-transitory storage medium having stored therein instructions that are executable by one or more hardware processors to perform operations comprising the operations of any one or more of embodiments 1-11.

G. EXAMPLE COMPUTING DEVICES AND ASSOCIATED MEDIA

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 5:
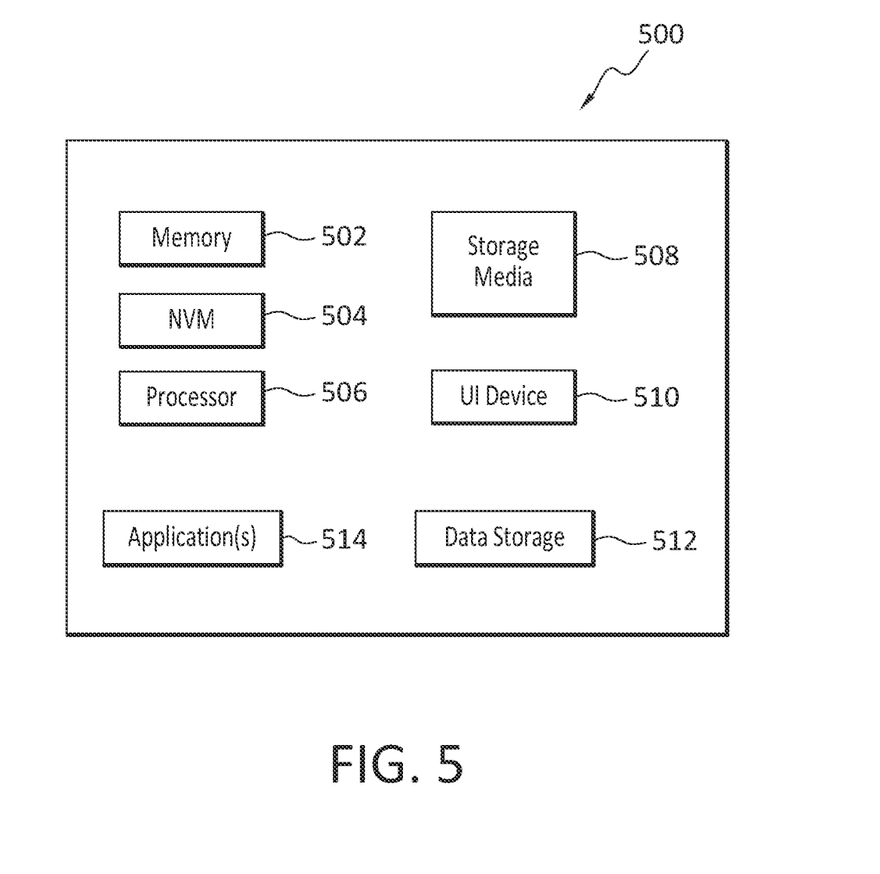
FIG. 5 discloses aspects of an example computing entity operable to perform any of the claimed processes, methods, and operations.

With reference briefly now to FIG. 5, any one or more of the entities disclosed, or implied, by FIGS. 1-4 and/or elsewhere herein, may take the form of, or include, or be implemented on, or hosted by, a physical computing device, one example of which is denoted at 500. As well, where any of the aforementioned elements comprise or consist of a virtual machine (VM), that VM may constitute a virtualization of any combination of the physical components disclosed in FIG. 5.

In the example of FIG. 5, the physical computing device 500 includes a memory 502 which may include one, some, or all, of random access memory (RAM), non-volatile memory (NVM) 504 such as NVRAM for example, read-only memory (ROM), and persistent memory, one or more hardware processors 506, non-transitory storage media 508, UI device 510, and data storage 512. One or more of the memory components 502 of the physical computing device 504 may take the form of solid state device (SSD) storage. As well, one or more applications 514 may be provided that comprise instructions executable by one or more hardware processors 506 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, comprising:
    by a data source entity, querying a data storage entity to determine if the data storage entity has adequate under-utilized resources to perform a portion of a data seeding process;
    when it is determined that the data storage entity is under-utilized based on one or more conditions, initiating, by the data source entity, the data seeding process, the data seeding process comprising transmitting data from the data source entity to the data storage entity for storage in a temporary file at the data storage entity, wherein one of the conditions are that the data storage entity indicates to the data source entity that a usage rate of resources of the data storage entity is less than or equal to a threshold prior to a predetermined time slot to perform the portion of the data seeding process, and wherein the data that is transmitted is data that was targeted to be protected by a data protection process; and
    performing the data protection process so that only data not already present at the data storage entity is transmitted by the data source entity to the data storage entity.

2. The method as recited in claim 1, wherein the data protection process is either a data backup process, or a data replication process.

3. The method as recited in claim 1, wherein the data seeding process is designated as a statically/dynamically configurable lower priority process at the data source entity.

4. The method as recited in claim 1, wherein the data is deduplicated before being sent to the data storage entity.

5. The method as recited in claim 1, wherein performance of the data protection process proceeds more quickly than it would if the data had not been transmitted to the data storage entity prior to performance of the data protection process.

6. The method as recited in claim 1, wherein the data is ingested by, and/or generated at, the data source entity.

7. The method as recited in claim 1, wherein the data protection process sends only new data to the data storage entity.

8. The method as recited in claim 1, wherein an AI/ML model configures and controls the data seeding process.

9. The method as recited in claim 1, wherein another of the conditions is that adequate client and network resources are available to support performance of the data seeding process.

10. The method as recited in claim 1, wherein the data source entity obtains the data by intercepting write operations taking place at the data source entity, and the data seeding process is performed on an ongoing basis as the write operations are intercepted.

11. A non-transitory storage medium having stored therein instructions that are executable by one or more hardware processors to perform operations comprising:
    by a data source entity, querying a data storage entity to determine if the data storage entity has adequate under-utilized resources to perform a portion of a data seeding process;
    when it is determined that the data storage entity is under-utilized based on one or more conditions, initiating, by the data source entity, the data seeding process, the data seeding process comprising transmitting data from the data source entity to the data storage entity for storage in a temporary file at the data storage entity, wherein one of the conditions are that the data storage entity indicates to the data source entity that a usage rate of resources of the data storage entity is less than or equal to a threshold prior to a predetermined time slot to perform the portion of the data seeding process, and wherein the data that is transmitted is data that was targeted to be protected by a data protection process; and
    performing the data protection process so that only data not already present at the data storage entity is transmitted by the data source entity to the data storage entity.

12. The non-transitory storage medium as recited in claim 11, wherein the data protection process is either a data backup process, or a data replication process.

13. The non-transitory storage medium as recited in claim 11, wherein the data seeding process is designated as a statically/dynamically configurable lower priority process at the data source entity.

14. The non-transitory storage medium as recited in claim 11, wherein the data is deduplicated before being sent to the data storage entity.

15. The non-transitory storage medium as recited in claim 11, wherein performance of the data protection process proceeds more quickly than it would if the data had not been transmitted to the data storage entity prior to performance of the data protection process.

16. The non-transitory storage medium as recited in claim 11, wherein the data is ingested by, and/or generated at, the data source entity.

17. The non-transitory storage medium as recited in claim 11, wherein the data protection process sends only new data to the data storage entity.

18. The non-transitory storage medium as recited in claim 11, wherein an AI/ML model configures and controls the data seeding process.

19. The non-transitory storage medium as recited in claim 11, wherein another of the conditions is that adequate client and network resources are available to support performance of the data seeding process.

20. The non-transitory storage medium as recited in claim 11, wherein the data source entity obtains the data by intercepting write operations taking place at the data source entity, and the data seeding process is performed on an ongoing basis as the write operations are intercepted.

* * * * *